(No Model.) 2 Sheets—Sheet 2.

F. FISHER.
WAGON BOX.

No. 359,436. Patented Mar. 15, 1887.

WITNESSES:
Fred G. Dieterich
Leon A. Kenion

INVENTOR:
F. Fisher
BY Munn & Co
ATTORNEYS.

UNITED STATES PATENT OFFICE.

FRANCIS FISHER, OF SCOTIA, NEBRASKA.

WAGON-BOX.

SPECIFICATION forming part of Letters Patent No. 359,436, dated March 15, 1887.

Application filed December 8, 1886. Serial No. 220,979. (No model.)

*To all whom it may concern:*

Be it known that I, FRANCIS FISHER, of Scotia, in the county of Greeley and State of Nebraska, have invented certain new and useful Improvements in Wagon-Boxes, of which the following is a clear, concise, and exact specification, reference being had to the accompanying drawings, forming part thereof, in which—

Figure 1:
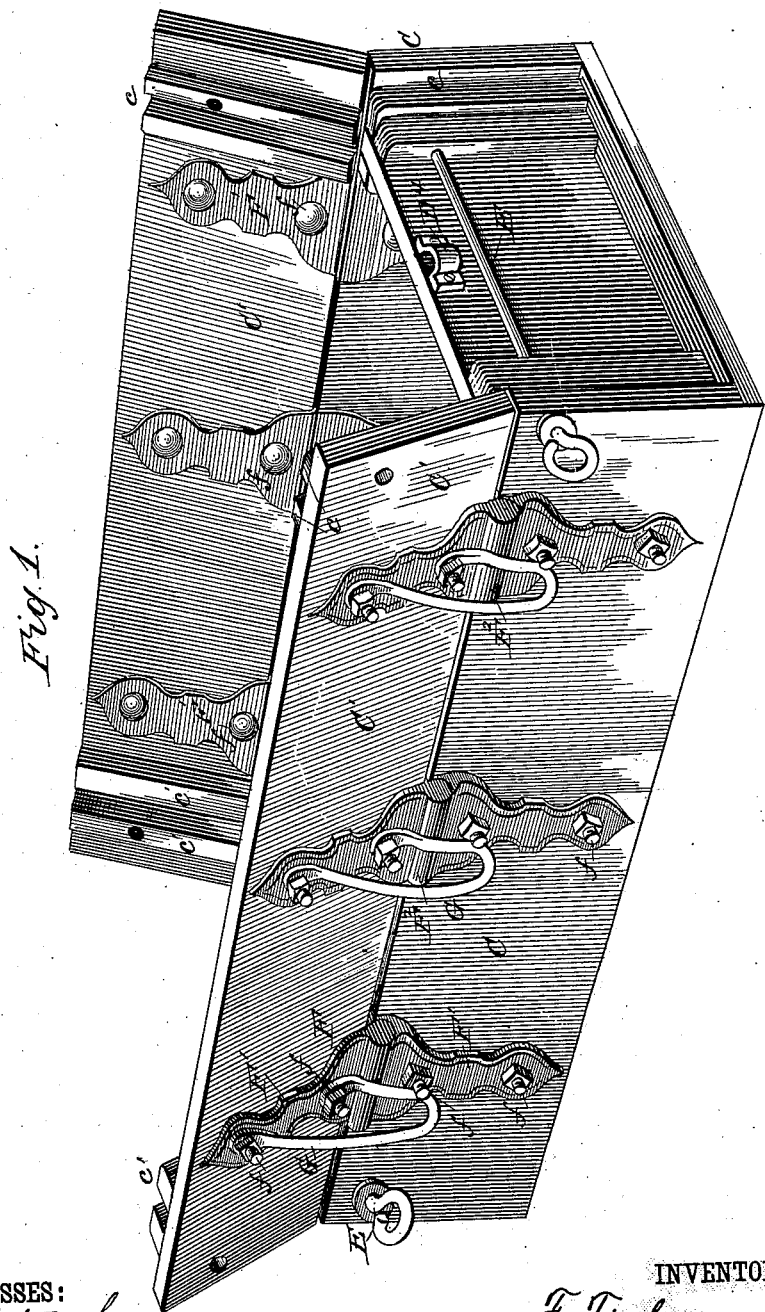
Figure 2:
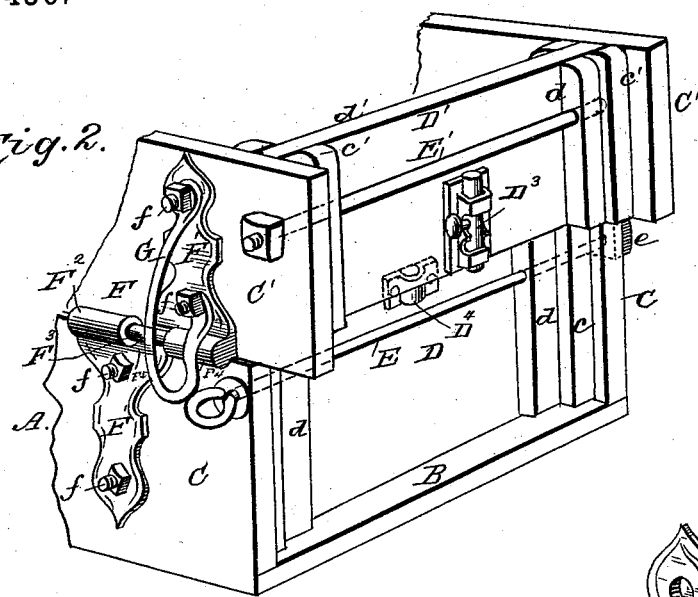
Figure 3:
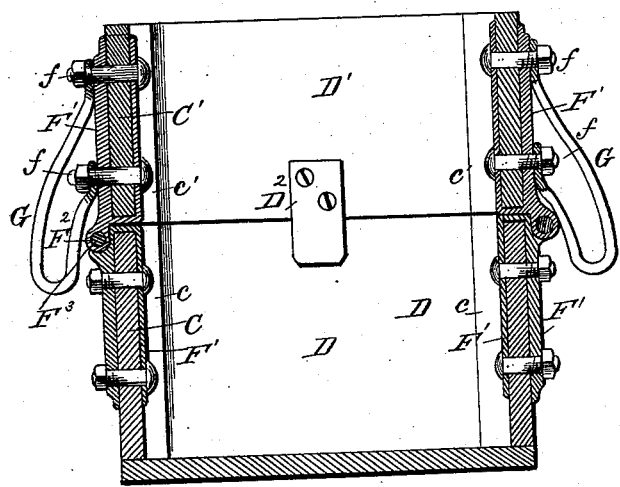
Figure 4:
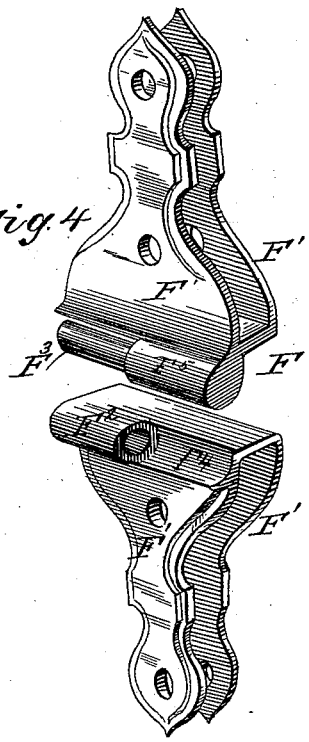

Figure 1 is a perspective view of the box with the sides of its upper section inclined outward, the ends or gates of said section being removed. Fig. 2 is a perspective view, looking at the rear of the box, the upper section being partially removed from the lower section, and the locking-bolt $D^3$ being disengaged from its socket $D^4$. Fig. 3 is a vertical cross-sectional view of the box through the hinges, looking toward the front end of the box. Fig. 4 is a perspective view of one of the hinges detached.

My invention will first be described, and then specifically pointed out in the claims.

A represents the lower or main part of the box, composed of the bottom B, sides C, secured thereto in any suitable manner, and the end-gates D, which slide between cleats $c\ c$ at opposite ends of the sides. The outer sides of the ends or gates D have vertical strengthening-strips $d$ secured thereto, and cross-rods E pass through apertures formed in the sides C, outer cleats, $c$, and the strips $d$, nuts $e$ being screwed upon the threaded ends of the rods to bind the parts firmly together. The removable upper or supplemental section is composed of the sides C, having cleats $c'\ c'$, in alignment with the cleats $c\ c$ on the main sides, between which the ends D', having cleats $d'$, slide, and cross-rods E' secure these ends and sides together, just as in the lower or main section. The rear end, D', of the removable upper or supplemental section has a vertically-sliding bolt, $D^3$, on the lower part of its outer face, and projecting below and into the socket $D^4$ on the rear end, D, of the lower or main section. The forward upper gate, D', has a plate, $D^2$, on its inner face projecting below its lower edge to engage the upper inner surface of the forward lower end-gate, D, as shown in Fig. 3.

The sides C C' are hinged together by means of hinges F, the leaves of which are each made with double straps F' F', which extend on opposite sides of the upper and lower side pieces, C C', as clearly shown in the drawings. Bolts $f$ pass through these straps F' and the sides. The upper edges of the lower leaves are formed with the eyes $F^2$, into which the pintles $F^3$ on the lower edges of the upper leaves fit. These pintles all project or extend toward the front end of the wagon, so that when the upper section is to be removed it is simply necessary to raise the bolt $D^3$, as shown in Fig. 2, when the upper or supplemental section may be slid rearward until the pintles leave their eyes or sockets, when the said upper section may be readily lifted off without being taken to pieces.

In order that a tight joint may be formed between the upper and lower sections to prevent the loss of grain, the eyes $F^2$ of the lower leaves of the hinges are formed on the forward outer corners of the upper edges thereof, and in line with said eyes the leaves are concaved or recessed at $F^4$, so that the knuckles $F^5$, which carry the pintles $F^3$, may rest in said concavities, and thus bring the inner adjacent flat surfaces of the hinges close together, so that when in position the adjacent edges of the upper section and sides C' C will be brought together, as in Fig. 3, so that no grain or other farm product can be wasted. In a prior construction the connection between the upper and lower sections was made by several hinges, like those ordinarily made by country blacksmiths for use on farm-gates, the pintles all projecting in one direction, so that the top section could be slid off of the lower section; but these hinges did not bring the adjacent edges of the sections together, and no means was provided for preventing the top section from accidentally sliding off.

In order to facilitate handling the upper section, I provide the handles G, which are secured to the upper leaves of the hinges by the same bolts, $f$, which secure said leaves to the sides. These handles also serve as braces or stops to limit the outward movement of the sides C', as clearly shown in Fig. 1.

Two, three, or any suitable number of hinges may be used at each side; but I prefer three. It is obvious that these handle-braces G might be formed integral with the upper leaves of the hinges.

I am aware that double-strap hinges are not broadly new; also, that brace-rods have been hinged at their upper ends to the upper hinged sides of a wagon, their lower ends having apertures to receive the ends of cross-rods on the wagon-body, so as to support the sides of the upper section in an inclined position; but such hinged rods could not serve the purpose of handles in lifting the top section on and off of the lower section, like my handle-braces G, which have no connection with the lower section, but simply rest against it at times.

Having thus described my invention, what I claim as new, and desire to secure by Letters Patent, is—

1. The combination, with the wagon-body, of an upper removable section, hinges connecting said body and upper section, and handles rigidly connected to the upper leaves of the hinges and free at their lower ends to strike the sides of the body or lower section and support the sides of the upper section in an inclined position, substantially as set forth.

2. The combination, with the lower section or body of the wagon and the removable upper section, of the hinges F, formed with double straps F', the lower leaves having the eyes $F^2$ and the concavities $F^4$, and the upper leaves having the knuckles $F^5$ projecting from their lower outer edge, resting in the concavities $F^4$, and having the pintles $F^3$ engaging the eyes $F^2$, substantially as set forth.

3. The combination, with the lower section or body and the upper section, of the separable hinges F, securing said sections together, the handles G, secured at both ends to the upper leaves of the hinges, the lower looped parts being adapted to strike the lower section and support the sides of the upper section when inclined, the bolt $D^3$ on the end of the upper section, and the socket $D^4$ on the end of the lower section, substantially as set forth.

FRANCIS FISHER.

Witnesses:
H. H. ERNEST,
D. C. HALL.